United States Patent Office 3,004,391
Patented Oct. 17, 1961

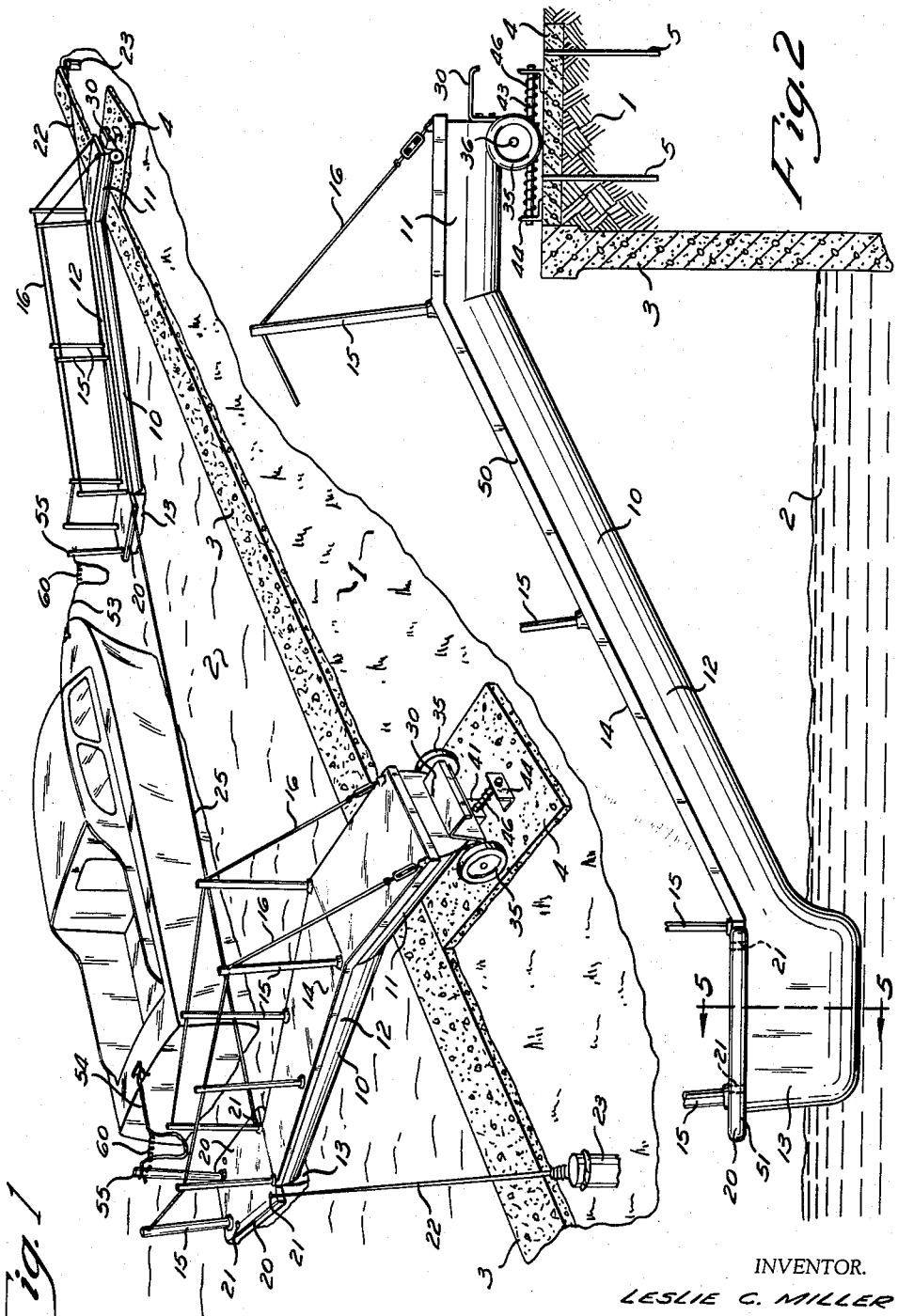
INVENTOR.
LESLIE C. MILLER
BY WATTS & EDGERTON
ATTORNEYS

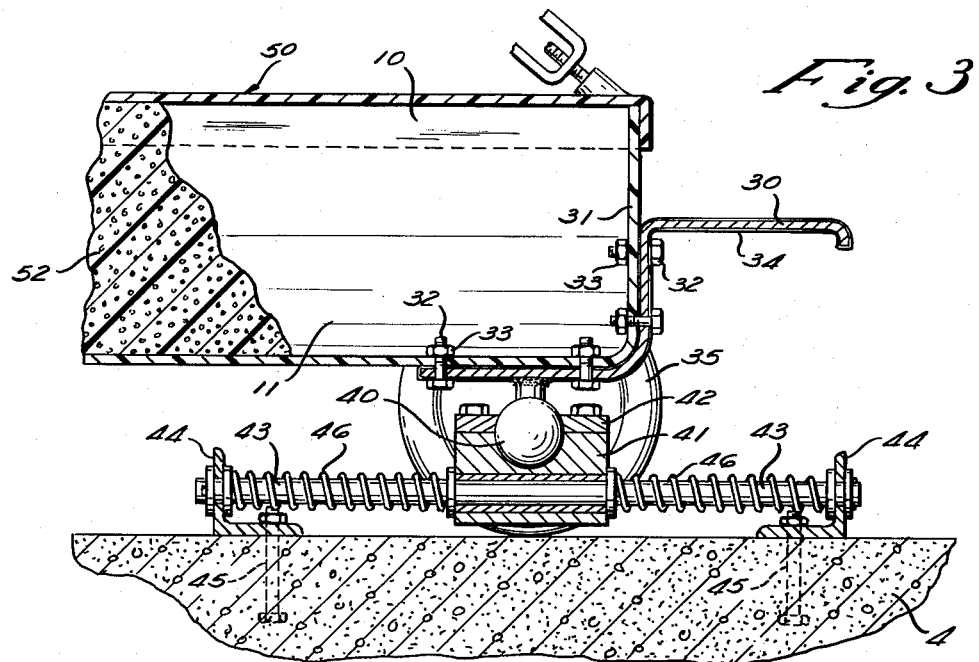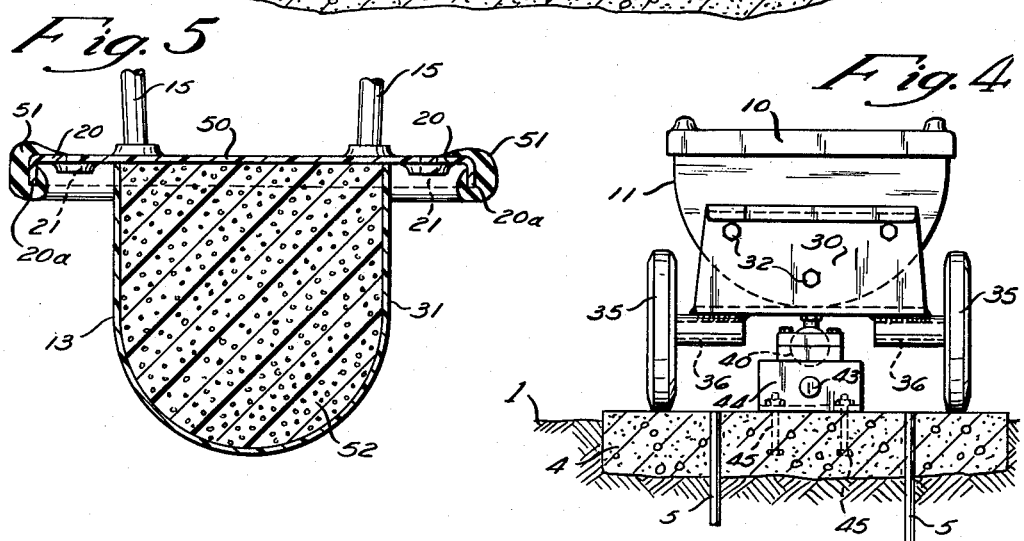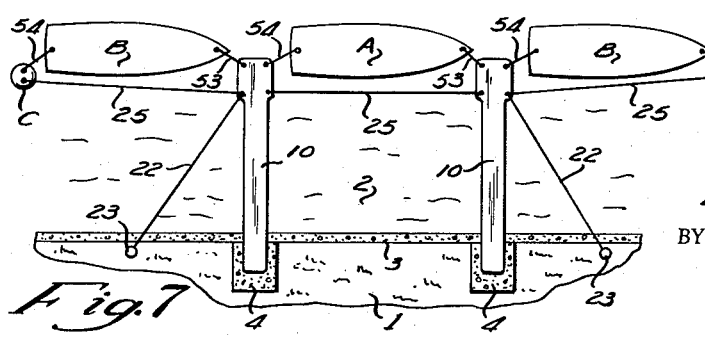

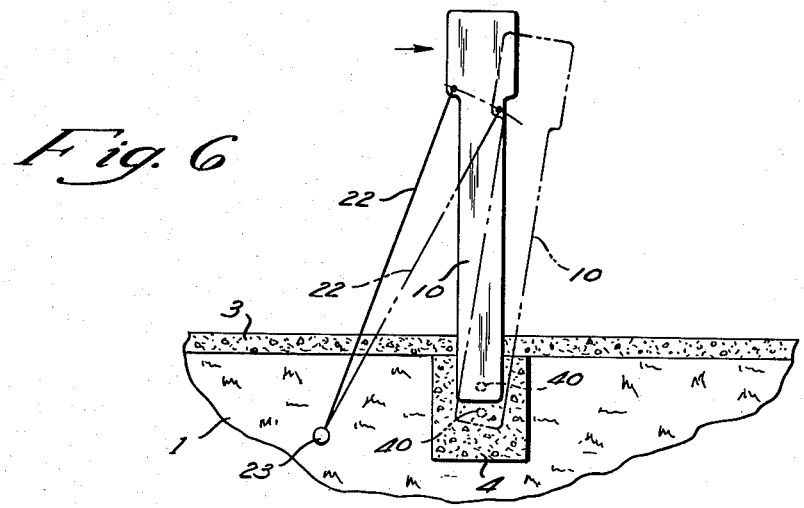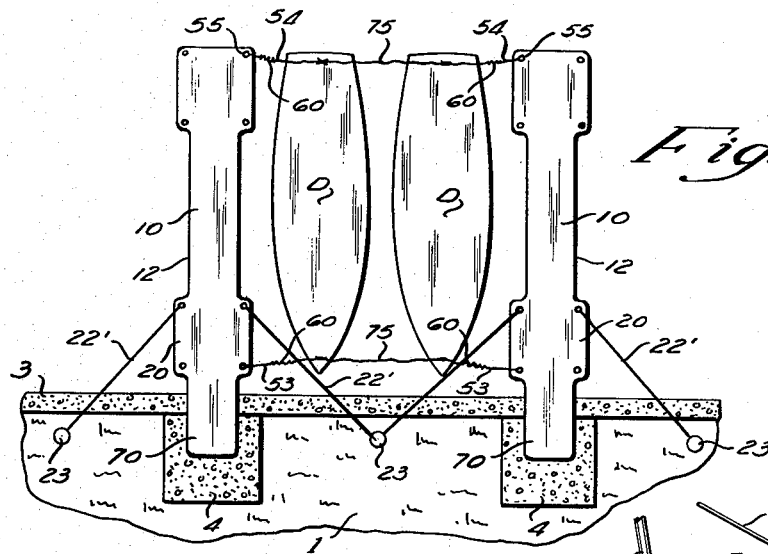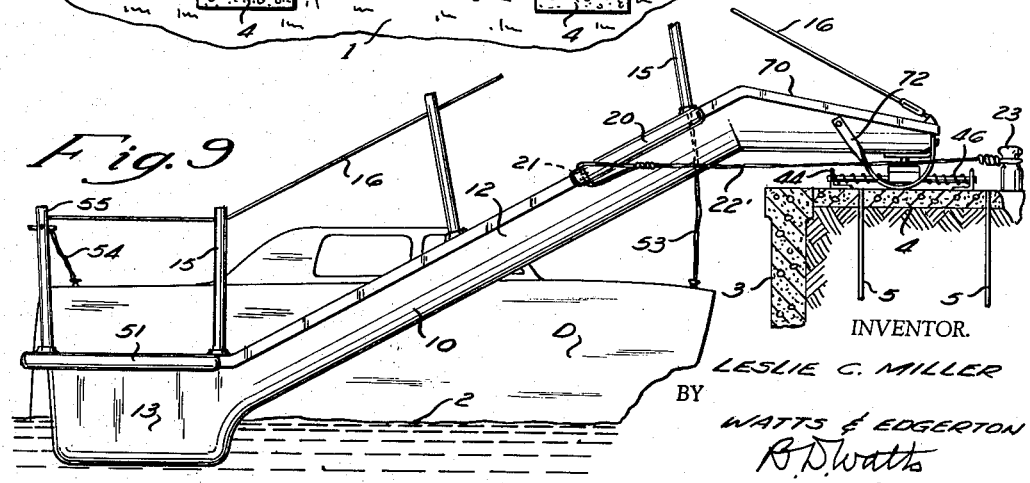

3,004,391
FLOATING DOCK
Leslie C. Miller, Macedonia, Ohio
(679 Norsota Way, Sarasota, Fla.)
Filed July 16, 1958, Ser. No. 748,984
7 Claims. (Cl. 61—48)

This invention relates generally to the boat dock art and is particularly concerned with a new device which is a combined dock and walk, which floats at one end on the water and which is connected at the other end to the shore for limited movement in response to movements of the water.

Heretofore boat docks have been constructed as rigid structures which were fixed against movement relative to the shore and the water. A boat secured to such a dock moves relative to the dock in response to wave action with the result that unless precautions are taken the moving boat may be damaged by impact against the fixed dock; and this danger increases as the extent of wave action increases. Moreover, such prior docks could not be removed for maintenance, repair or removal of barnacles and the like, and in climates where freezing occurred those docks were subject to the damage incident to ice action.

A need has long existed for a dock which could be anchored to the shore and would float on the water and move to a limited extent in response to waves and tides and which could be readily removed for maintenance, repair, cleaning and storage and to which a boat could be secured with little or no danger of damage even in high winds. The present invention satisfies that need.

This invention will be better understood by those skilled in the art from the following description taken in conjunction with the accompanying drawings in which:

FIG. 1 is a perspective view of one form of the present invention and showing the new docks attached to the shore and to a boat;

FIG. 2 is a side elevational view, partly in section, of one of the docks of FIG. 1;

FIG. 3 is a fragmentary, vertical central sectional view taken through the shore end of one of the docks of FIG. 1;

FIG. 4 is an end elevational view of one of the docks of FIG. 1 showing the shore end of the dock and the parts associated therewith for limited movement of the dock relative to the shore;

FIG. 5 is a fragmentary, vertical cross-sectional view taken through the float end of the dock;

FIG. 6 is a diagrammatic plan view showing the relative position of the parts of a dock and its mooring cable when the dock is subjected to lateral forces applied horizontally to the side of the dock;

FIG. 7 is a diagrammatic plan view of an alternative manner of using the docks of FIG. 1;

FIG. 8 is a diagrammatic plan view of still another manner of using docks embodying the present invention; and FIG. 9 is a side elevational view of one of the docks of FIG. 8.

In FIGS. 1 and 2, 1 designates the shore, 2 a body of water and 3 a seawall along the water side of the shore, and 4 designates concrete slabs fixed to the shore, as by anchors 5 and positioned in contact with the shore side of the seawall.

It will be understood that the seawall does not form a part of the present invention and that the concrete slabs 4 are provided for supporting the shore end of the dock for limited relative movement and may be replaced by any structure capable of serving the same purpose.

Two docks 10 are shown in FIG. 1 and one of these docks is shown in side elevation in FIG. 2. Each dock comprises an elongated body having a substantially horizontal shore end 11, a downwardly inclined central part 12 and an enlarged float end 13 to float on the water 2. The top of dock 10 has a flat surface 14 extending from end to end thereof and serving as a path on which people may walk from the shore to a boat positioned adjacent to the float end 13. Vertical posts 15 and hand ropes 16 serve to insure the safety of people while walking along the dock.

The dock 10 may be made of any desired length but when, as illustrated for example, it approximates 12 feet in length, the float end will be several feet below the shore end.

The float end 13 of each of the docks of FIG. 1 has an outwardly projecting ledge 20 which is shown in more detail in FIG. 5 and will be described in connection therewith. This ledge 20 is provided with a plurality of holes 21. In FIG. 1 cables or mooring lines 22 are fastened to anchors 23 on the shore and to ledges 20 by way of one of the holes 21 to prevent lateral movement of the docks. A cable 25, which is preferably composed of "nylon," is attached to and connects the ledges 20 of the two boat docks 10. The cables or lines 22 and 25 serve to maintain the docks 10 in approximate parallelism and at approximately right angles to the seawall 3. In addition line 25 serves as a distinct aid in docking a boat as will presently be pointed out.

FIGS. 3 and 4 show in some detail the shore end of one of the docks 10. A step 30 is attached to the shell 31 of the dock, as by means of bolts 32 and nuts 33. This step projects from the shore end of the dock and affords a step part way between the shore surface and the walkway 14 on the top of the dock. The step 30 is preferably composed of metal covered with some suitable material such as plastic, as indicated at 34, the purpose of this covering being partly to resist corrosion of the metal.

The shore end of the dock is provided with means which supports it, prevents it from tilting or tipping over and permits limited lateral and longitudinal movement of the dock relative to the shore as well as vertical movement. The supporting means illustrated in FIGS. 1 to 4 of the drawings comprises wheels 35 disposed adjacent to the vertical sides of the shore end of the dock and mounted to rotate on axles 36 which are fixed to the lower portion of the shore end of the dock.

Universal motion means is shown in FIGS. 3 and 4 for connecting the shore end of each dock to the shore. This means, as illustrated, comprises the ball 40 of a ball and socket joint secured to, and depnding from, the shore end of the dock. The socket of the ball and socket joint is formed by block 41 and plate 42. These two members are provided with a socket which has a surface formed by a segment of a sphere conforming to the outer surface of the ball 40 which is located in the socket. The member 41 is slidably mounted on a rod 43 which is disposed longitudinally of dock 10 and has its ends secured to angles 44 which are attached to slab 4 in any suitable manner as, for example, by means of bolts 45. Resilient means associated with rod 43 serve to position block 41 on rod 43. As illustrated, this resilient means includes springs 46 which are coiled around the rod, abut against angles 44 at their remote ends and against block 41 at their adjacent ends. These springs serve to permit limited longitudinal motion of dock 10 along rod 43. By reason of this ball and socket construction the dock may have limited movement vertically, laterally and longitudinally relative to the shore.

As is shown in FIG. 5, the ledge 20 of the float and of the dock is provided with an outwardly projecting portion having a down-turned flange 20a provided with holes 21. The flange 20a and adjacent part of the outwardly projecting portion of ledge 20 is covered with resilient material 51, for example, foam rubber to act as a bumper for engagement by a boat.

As is indicated in FIGS. 3 and 5, each dock consists of a thin, hollow, strong shell filled with light-weight, expanded material under compression. The shell is preferably composed of a strong skeleton, such as fiberglass cloth, screen wire, plywood and the like, embedded in an artificial resin such as polyester. The filler is preferably composed of light-weight, expanded artificial resin, such as styrene or polyester.

The dock 10 may be readily constructed by the following procedure, assuming that fiberglass cloth, polyester and styrene are the materials to be used:

Several layers of polyester jell are applied in successive thin coats to the inner surface of a female mold corresponding in configuration to the desired outer surface of the dock. Then fiberglass cloth is applied to the inner surface of the polyester jell and one or more coatings of polyester jell are applied to the inner surface of the cloth. Several layers of the cloth may be applied, as just described, to give a shell of the desired thickness and strength. The inner surface of the innermost cloth layer is covered with one or more layers of polyester jell. The resulting part of the shell is indicated at 31 in FIG. 5. While that part is being formed, as just described, the shell top 50 may be formed in a similar manner by using a flat mold shaped to form the shell 50 with its ledges 20 and flanges 20a. The shell top is shown at 50 in FIG. 5.

When shell parts 31 and 50 are ready, a quantity of expandable synthetic resin such as styrene or polyester is placed in part 31 and top 50 is applied thereto and the two parts are clamped together so that they may not be separated by the expansive forces of the expandable material within the form. The amount of expandable material to be placed in shell 31 should be sufficient so that when expanded it will fill the shell completely and apply considerable force outwardly against the shell parts 31 and 50. The resin material in shell 50 may be expanded in any suitable and well known manner as, for example, by admitting steam into the interior of the space defined by shell parts 31 and 50.

It will be understood that the expandable material is light in weight, its weight amounting only to about 1½ pounds per cubic foot and thus that the float end of the dock will float on the water. It will also be understood that the expanded resinous material is substantially non-water absorbent for the voids in this material are not connected with one another to any substantial extent and hence even if the shell 31 or 50 should be punctured so that water could come into contact with the expanded material 52, the water can not penetrate into this material to such an extent as to waterlog the dock and cause it to sink. Since the dock is unsinkable, it will tend to prevent the sinking of a boat moored thereto.

It will also be understood that by reason of confining the expanded material under compression in the shell and by making the shell strong, as just described, the dock will be strong and highly resistant to impact blows. Also by reason of the extreme light weight of the dock it may be readily handled and moved into and out of place in the water. The location of the supporting means on either side of the shore end makes for stability against tipping because of the wide base afforded by these supporting means.

It will be understood by reference to FIG. 2 that the float end of the dock may rise and fall through several feet since the clearance between the underside of the dock and top of the seawall permits the float end to move downward vertically a considerable distance below the position shown in FIG. 2, and the vertical movement of the float end above the position shown in FIG. 2 is not substantially hampered or restricted by the shore end of the dock.

As stated above, the dock may move longitudinally relative to the shore within the limits fixed by block 41, spring 46 and angles 44.

The docks of FIG. 1 are also capable of considerable lateral or horizontal movement as is diagrammatically shown in FIG. 6. When a force or impact is applied horizontally or laterally against one side of the float end of a dock 10, it will cause that dock to swing laterally about the ball and socket joint 40 and 41 and also to move longitudinally by compressing spring 46 on the shore side of that joint. This action results from the fact that mooring line 22 is anchored to the shore and is fastened to the dock and when a force is applied laterally to the float end of the dock, its tendency to pivot around the ball and socket joint will be restrained by cable 22 and permitted by the shore side spring 46 which will be compressed by a resultant of the applied force. Thus, as FIG. 6 illustrates, the dock 10, which was perpendicular to the seawall at the time a lateral force was applied thereto, will shift to the dotted line position where it will form an included angle of less than 90° with the seawall and it will simultaneously move longitudinally toward the shore a distance which is limited by the strength of the force and the resistance of spring 46 to compression.

FIG. 1 shows one manner of using the present invention. In that figure, two docks 10 are connected together by cable 25, as above described. With that arrangement of docks and cable one person is able to dock a boat without any assistance. To do so it is only necessary to bring the boat into contact with cable 25 and propel the boat therealong until one end abuts against the bumper 51 on ledge 20 of one of the docks. While the boat is being urged against that ledge, a bow line 53 may be secured to post 55 on that dock or the line may be made fast to one of the holes 21 in that dock. If the boat engine is allowed to idle during the time the bow line is being secured to one of the docks, the shore side of the boat will be urged against line 25 and the stern line 54 may be fastened to the post 55 of the other dock or to the ledge 20 thereof. Thus one person may dock a boat without any assistance. Preferably the bow and stern lines are equipped with resilient take-up means. As illustrated in FIG. 1, this means comprises a coil spring 60 connected at two places to the line with a loop of the line between the points of connection which is slightly shorter than the spring when fully expanded. Thus when a tensile force is applied to one end of the line, the spring will be expanded considerably before the slack in the loop is taken up. By reason of this spring take-up, the boat may be kept out of contact with both docks under normal conditions. In case of high waves the docks and boat will rise and fall with the waves and the cables 25 and the spring take-ups 60 on the bow and stern lines 53 and 54 of the boat will tend to keep the boat out of contact with the docks and the shore even when the wind and waves are both high.

FIG. 7 shows another way of utilizing the present invention. In that figure the boat A is secured between two docks 10 after the fashion shown in FIG. 1 and just described. Two other boats B are also moored to the docks. Float means C, such as a buoy, is anchored far enough away from docks 10 to provide between each float and the adjacent dock a space adequate for a boat B and the floats are connected to the docks by lines 25 like the line connecting the docks together.

A single dock 10 may also be used with two boats as will readily be understood by reference to FIG. 7. If one dock 10 and one boat B of that figure are removed, and if one float means C is moved into the position occupied by the removed dock 10 and connected to boat A, the two boats A and B may thus be docked with the use of a single dock 10 and two floats C. Of course, it is obvious that one boat can be accomodated by one dock 10 and a single float C.

Still another manner of employing the present invention is illustrated in FIGS. 8 and 9. In these figures the docks 10 are generally like those shown in FIGS. 1 and 2. One difference is that the shore end of the dock lacks the step 30, and the top surface of the shore end of the docks have been sloped downwardly toward the rear end of the dock as indicated at 70, thus providing a sloping ramp along which pedestrians may walk.

Another difference is that the means supporting the shore end of each dock includes a pair of skids 72 in lieu of the wheels 35 of FIGS. 1 to 5. These skids are disposed in approximately the positions of wheels 35 and may consist of curved, sled-runner-like members composed, for example, of steel and covered with some corrosion preventing, abrasion resisting material, such as suitable synthetic resin.

Another difference is that the mooring lines 22' are connected to the mid-part 12 of each of the docks; that is, closer to the shore than is shown in FIG. 1.

Between two adjacent docks 10 of FIG. 8, two boats D are moored, each one having its stern line 54 connected to the float end of the adjacent dock and its bow line 53 connected to a ledge 20 attached to the mid-part 12 of the dock. Preferably these bow and stern lines are provided with spring take-ups 60, as above described, so that the boats will not contact one another and also preferably the two boats are connected to each other by lines 75 which may include spring take-ups if desired. In this manner the two boats are out of contact with the docks and with each other.

It will be understood that the just described arrangement with two boats in the slip between a pair of docks may be resorted to where shore space is at a premium. Where shore space is not at such a premium, it is preferable to tie up a single boat in each slip between two docks. Such an arrangement may be visualized by omitting one of the boats of FIG. 8 and connecting bow and stern lines of the remaining boat to both docks.

Having thus described this invention in such full, clear, concise and exact terms as to enable any person skilled in the art to which it pertains to make and use the same, and having set forth the best mode contemplated of carrying out this invention, I state that the subject-matter which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. A dock comprising an elongated body having a front end to float on the water and a shore end, means to prevent tilting of the dock, said means including shore-engaging supports attached to the shore end of the body adjacent to its vertical sides, and means connecting the shore end of the body to the shore for limited vertical, longitudinal and lateral movement of the dock, said means including a universal motion device attached to said shore end, guide means attached to the shore and guiding the device for longitudinal movement of the dock, and resilient means engaging the device and guide for resiliently restraining movement of the device on said guide.

2. A dock comprising an elongated body having a front end to float on the water and a shore end, means to prevent tilting of the dock, said means including wheels attached to the shore end of the body adjacent to its vertical sides, and means connecting the shore end of the body to the shore for limited vertical, longitudinal and lateral movement of the dock, said means including a universal motion device attached to said shore end, guide means attached to the shore and guiding the device for longitudinal movement of the dock, and resilient means engaging the device and guide for resilient restraining movement of the device on the guide.

3. A dock comprising an elongated body having a front end to float on the water and a shore end, means to prevent tilting of the dock, said means including shore-engaging skids attached to the shore end of the body adjacent to its vertical sides, and means connecting the shore end of the body to the shore for limited vertical, longitudinal and lateral movement of the dock, said means including a universal motion device attached to said shore end, guide means attached to the shore and guiding the device for longitudinal movement of the dock, and resilient means engaging the device and guide for resiliently restraining movement of the device on said guide.

4. A dock comprising an elongated body having a front end to float on the water and a shore end, means to prevent tilting of the dock, said means including shore-engaging supports attached to the shore end of the body adjacent to its vertical sides, and means connecting the shore end of the body to the shore for limited vertical, longitudinal and lateral movement of the dock, said means including interengaging ball and socket members, one of which is attached to the shore end, a guide attached to the shore and engaging the other of said members to guide it for longitudinal movement of the dock, and resilient means engaging the member guided by the guide for resiliently restraining movement of the guided member on the guide.

5. A dock comprising an elongated body having a front end to float on the water and a shore end, means to prevent tilting of the dock, said means including wheels attached to the shore end of the body adjacent to its vertical sides, and means connecting the shore end of the body to the shore for limited vertical, longitudinal and lateral movement of the dock, said means including interengaging ball and socket members, one of which is attached to the shore end, a guide attached to the shore and engaging the other member to guide it for longitudinal movement of the dock, and resilient means engaging the guided member for resiliently restraining longitudinal movement of that member on the guide.

6. A dock comprising an elongated body having a front end to float on the water and a shore end, means to prevent tilting of the dock, said means including shore-engaging supports attached to the shore end of the body adjacent to its vertical sides, and means connecting the shore end of the body to the shore for limited vertical, longitudinal and lateral movement of the dock, said means including interengaging ball and socket members with the ball member being attached to the shore end, a guide engaging the socket member and attached to the shore for guiding longitudinal movement of the socket member, and resilient means on the guide and engaging said socket member for resiliently restraining movement of the socket member on the guide.

7. A dock comprising an elongated body having a front end to float on the water and a shore end, means to prevent tilting of the dock, said means including shore-engaging supports attached to the shore end of the body adjacent to its vertical sides, and means connecting the shore end of the body to the shore for limited vertical, longitudinal and lateral movement of the dock, said means including interengaging ball and socket members with the ball member depending from the shore end of the body, the socket member having a hole therethrough, a rod extending through said hole and attached to the shore for guiding longitudinal movement of the socket member, and resilient means around the rod and engaging opposite sides of the socket member for resiliently restraining movement of the socket member on the guide.

References Cited in the file of this patent

UNITED STATES PATENTS

| 1,013,584 | Brunnier | Jan. 2, 1912 |
| 1,996,955 | Elliott | Apr. 9, 1935 |
| 2,715,314 | Smith | Aug. 16, 1955 |
| 2,759,331 | Fiebinger et al. | Aug. 21, 1956 |

FOREIGN PATENTS

| 698,461 | France | 1930 |

OTHER REFERENCES

Architectural Record, pp. 103–108, June 1944.
Popular Mechanics, November 1956, p. 141.